(12) United States Patent
Andreyev et al.

(10) Patent No.: US 10,148,543 B2
(45) Date of Patent: Dec. 4, 2018

(54) CONNECTION-ORIENTED COMMUNICATION DEVICES WITH ROUND TRIP TIME ESTIMATION

(71) Applicant: EMC IP Holding Company LLC, Hopkinton, MA (US)

(72) Inventors: Ivan Andreyev, St-Petersburg (RU); Roman Marchenko, St-Petersburg (RU); Alexander Romanyukov, Leningrad Oblast (RU)

(73) Assignee: EMC IP Holding Company LLC, Hopkinton, MA (US)

(*) Notice: Subject to any disclaimer, the term of this patent is extended or adjusted under 35 U.S.C. 154(b) by 46 days.

(21) Appl. No.: 15/208,874

(22) Filed: Jul. 13, 2016

(65) Prior Publication Data
US 2017/0187598 A1    Jun. 29, 2017

(30) Foreign Application Priority Data

Dec. 23, 2015  (RU) .................................. 2015155284

(51) Int. Cl.
*H04L 12/26* (2006.01)
*H04L 12/801* (2013.01)
(Continued)

(52) U.S. Cl.
CPC ...... *H04L 43/0882* (2013.01); *H04L 43/0864* (2013.01); *H04L 47/12* (2013.01);
(Continued)

(58) Field of Classification Search
CPC ............. H04L 43/0858; H04L 43/0864; H04L 43/0882; H04L 43/106; H04L 47/12;
(Continued)

(56) References Cited

U.S. PATENT DOCUMENTS 7,274,299 B2 *  9/2007  Osman .................... H04W 4/02
                                                340/539.13
7,817,546 B2 * 10/2010  Filsfils .................. H04L 43/026
                                                370/231
(Continued)

FOREIGN PATENT DOCUMENTS

AU        6192490 A  *  3/1991  ............. H04L 47/10
CA        2023553 A1 *  3/1991  ............. H04L 47/10
(Continued)

OTHER PUBLICATIONS

Hedayat et al., A Two-Way Active Measurement Protocol, RFC 5357, Oct. 2008 (Year: 2008).*

(Continued)

*Primary Examiner* — Eric Nowlin
(74) *Attorney, Agent, or Firm* — Ryan, Mason & Lewis, LLP

(57) ABSTRACT

Connection-oriented communication devices are provided with round trip time estimation. An exemplary method is provided for communicating between first and second communication devices over a wide area communication network. The first communication device sends a Round Trip Time (RTT) packet comprising a timestamp to the second communication device. The second communication device receives the RTT packet, copies the timestamp into a reply RTT packet and sends the reply RTT packet to the first communication device. The first communication device receives the reply RTT packet and determines a current Round Trip Time based on a difference between the timestamp and a current time. The current Round Trip Time is optionally processed by a congestion avoidance and control algorithm. An application can control a size of a queue based on conditions of the wide area communication network.

21 Claims, 14 Drawing Sheets

(51) Int. Cl.
  *H04L 29/06* (2006.01)
  *H04L 29/08* (2006.01)
(52) U.S. Cl.
  CPC .............. *H04L 67/10* (2013.01); *H04L 67/42* (2013.01); *H04L 69/16* (2013.01)
(58) Field of Classification Search
  CPC ...... H04L 69/16; H04W 64/00; H04W 24/08; H04W 28/0284; H04B 17/364
  See application file for complete search history.

(56) References Cited

U.S. PATENT DOCUMENTS

| | | | |
|---|---|---|---|
| 8,064,356 B1* | 11/2011 | Krzanowski | H04L 41/04 370/249 |
| 8,102,852 B2* | 1/2012 | Marcondes | H04L 43/026 370/229 |
| 8,125,970 B2* | 2/2012 | Gu | G01S 11/02 370/338 |
| 8,274,891 B2* | 9/2012 | Averi | H04L 45/00 370/232 |
| 8,559,982 B2* | 10/2013 | Wu | G01S 5/04 455/11.1 |
| 8,761,037 B2* | 6/2014 | Krzanowski | H04L 41/04 370/249 |
| 8,769,366 B2* | 7/2014 | Axelsson | H04L 1/1614 370/236 |
| 8,773,993 B2* | 7/2014 | Shojania | H04L 12/2671 370/232 |
| 8,929,305 B2* | 1/2015 | Cho | H04L 5/1469 370/328 |
| 9,100,135 B2* | 8/2015 | Tosti | H04J 3/0667 |
| 9,357,534 B2* | 5/2016 | Xu | H04W 4/023 |
| 9,451,571 B2* | 9/2016 | Lorenz | H04W 56/0065 |
| 9,459,337 B2* | 10/2016 | Aldana | G01S 5/00 |
| 9,667,518 B2* | 5/2017 | Lakshmikantha | H04L 43/0852 |
| 9,918,283 B2* | 3/2018 | Braxton | H04W 52/245 |
| 9,935,756 B2* | 4/2018 | Marri Sridhar | H04L 5/0055 |
| 9,998,979 B2* | 6/2018 | Cui | H04W 48/20 |
| 2008/0144624 A1* | 6/2008 | Marcondes | H04L 43/026 370/392 |
| 2009/0010158 A1* | 1/2009 | Filsfils | H04L 43/026 370/231 |
| 2010/0110922 A1* | 5/2010 | Ketheesan | H04L 43/0858 370/252 |
| 2010/0202303 A1* | 8/2010 | Gu | G01S 11/02 370/252 |
| 2010/0205499 A1* | 8/2010 | Axelsson | H04L 1/1614 714/748 |
| 2011/0090856 A1* | 4/2011 | Cho | H04L 5/1469 370/329 |
| 2011/0274124 A1* | 11/2011 | Tosti | H04J 3/0667 370/503 |
| 2012/0063345 A1* | 3/2012 | Krzanowski | H04L 41/04 370/252 |
| 2012/0117273 A1* | 5/2012 | Averi | H04L 45/00 709/248 |
| 2012/0281715 A1* | 11/2012 | Shojania | H04L 12/2671 370/468 |
| 2013/0262951 A1* | 10/2013 | Axelsson | H04L 1/1614 714/749 |
| 2014/0003310 A1 | 1/2014 | Kamath et al. | |
| 2014/0241163 A1* | 8/2014 | Lee | H04W 48/16 370/235 |
| 2014/0355461 A1* | 12/2014 | Aldana | G01S 5/00 370/252 |
| 2015/0045048 A1* | 2/2015 | Xu | H04W 4/023 455/452.1 |
| 2016/0006526 A1* | 1/2016 | Cho | H04J 3/0661 370/503 |
| 2016/0044524 A1* | 2/2016 | Ben-Haim | G01S 5/14 370/252 |
| 2016/0088581 A1* | 3/2016 | Lorenz | H04W 56/0065 455/456.1 |
| 2016/0119968 A1* | 4/2016 | Kim | H04W 48/00 370/312 |
| 2016/0212032 A1* | 7/2016 | Tsuruoka | H04L 43/106 |
| 2016/0241373 A1* | 8/2016 | Marri Sridhar | H04L 5/0055 |
| 2016/0323421 A1* | 11/2016 | Sakurai | H04L 69/163 |
| 2016/0359753 A1* | 12/2016 | Robitaille | H04L 47/25 |
| 2017/0013569 A1* | 1/2017 | Braxton | H04W 52/245 |
| 2017/0078176 A1* | 3/2017 | Lakshmikantha | H04L 43/0852 |
| 2017/0093731 A1* | 3/2017 | Flajslik | H04L 43/12 |
| 2017/0094298 A1* | 3/2017 | Gu | H04N 19/46 |
| 2017/0188192 A1* | 6/2017 | Mujtaba | H04W 4/023 |
| 2017/0208534 A1* | 7/2017 | Cui | H04W 48/20 |
| 2017/0280343 A1* | 9/2017 | Chu | H04B 17/24 |
| 2017/0295585 A1* | 10/2017 | Sorrentino | H04L 5/001 |
| 2018/0152853 A1* | 5/2018 | Soder | H04W 24/02 |
| 2018/0152910 A1* | 5/2018 | Ryu | G01S 5/02 |
| 2018/0167894 A1* | 6/2018 | Braxton | H04W 52/245 |

FOREIGN PATENT DOCUMENTS

| | | | | |
|---|---|---|---|---|
| CN | 102197611 A | * | 9/2011 | ............ H04J 3/0667 |
| CN | 102197611 B | * | 6/2014 | ............ H04J 3/0667 |
| EP | 0415843 A2 | * | 3/1991 | ............ H04L 47/10 |
| EP | 2359510 A1 | * | 8/2011 | ............ H04J 3/0667 |
| EP | 2359510 B1 | * | 10/2012 | ............ H04J 3/0667 |
| EP | 2605453 A1 | * | 6/2013 | ......... H04L 43/0858 |
| WO | WO-2010045961 A1 | * | 4/2010 | ............ H04J 3/0667 |

OTHER PUBLICATIONS

Chiu et al., "Analysis of the Increase/Decrease Algorithms for Congestion Avoidance in Computer Networks", J. of Computer Networks and ISDN Systems, vol. 17, No. 1, 1-14 (Jun. 1989).
Lakshman et al., "The Performance of TCP/IP for Networks with High Bandwidth-Delay Products and Random Loss," IEEE ACM Trans. on Networking, vol. 5 No. 3, 336-50 (Jul. 1997).
Allman et al., "TCP Congestion Control," Request for Comments 5681 (RFC5681) (Sep. 2009).
E. Rescorla et al., "Datagram Transport Layer Security Version 1.2", Request for Comments 6347 (RFC 6347) (Jan. 2012).
W. Eddy, "TCP SYN Flooding Attacks and Common Mitigations" Request for Comments 4987 (RFC4987) (Aug. 2007).
Tan et al., "A Compound TCP Approach for High-speed and Long Distance Networks", in IEEE Infocom, Apr. 2006, Barcelona, Spain.
J. Postel, "User Datagram Protocol", downloaded from http//www.rfc-base.org/txt/rfc-768.txt, ISI, Aug. 28, 1980.
Marchenko et al., "Congestion Avoidance and Control for UDP-Based Protocols", U.S. Appl. No. 14/236,273, filed Aug. 25, 2014.

* cited by examiner

| Type value | Packet type |
|---|---|
| 0x0 | Data packet (DATA) |
| 0x1 | Probing packet, forward direction (RTT) |
| 0x2 | Probing packet, backward direction (BACKRTT) |
| 0x3 | Bitmap packet (BITMAP) |
| 0x4 | Connection request (CONN_REQ) |
| 0x5 | Connection response (CONN_RSP) |
| 0x6 | Connection acknowledgement (CONN_ACK) |
| 0x7 | Reserved (MTU probing) (MTU) |
| 0x8 | Reserved (MTU probing) (MTU_ACK) |
| 0x9 | Disconnection request (DISCO_REQ) |
| 0xa | Disconnection response (DISCO_RSP) |
| 0xb | Disconnection acknowledgement (DISCO_ACK) |
| 0xc | Connection verification request (VERIFY_REQ) |

FIG. 2

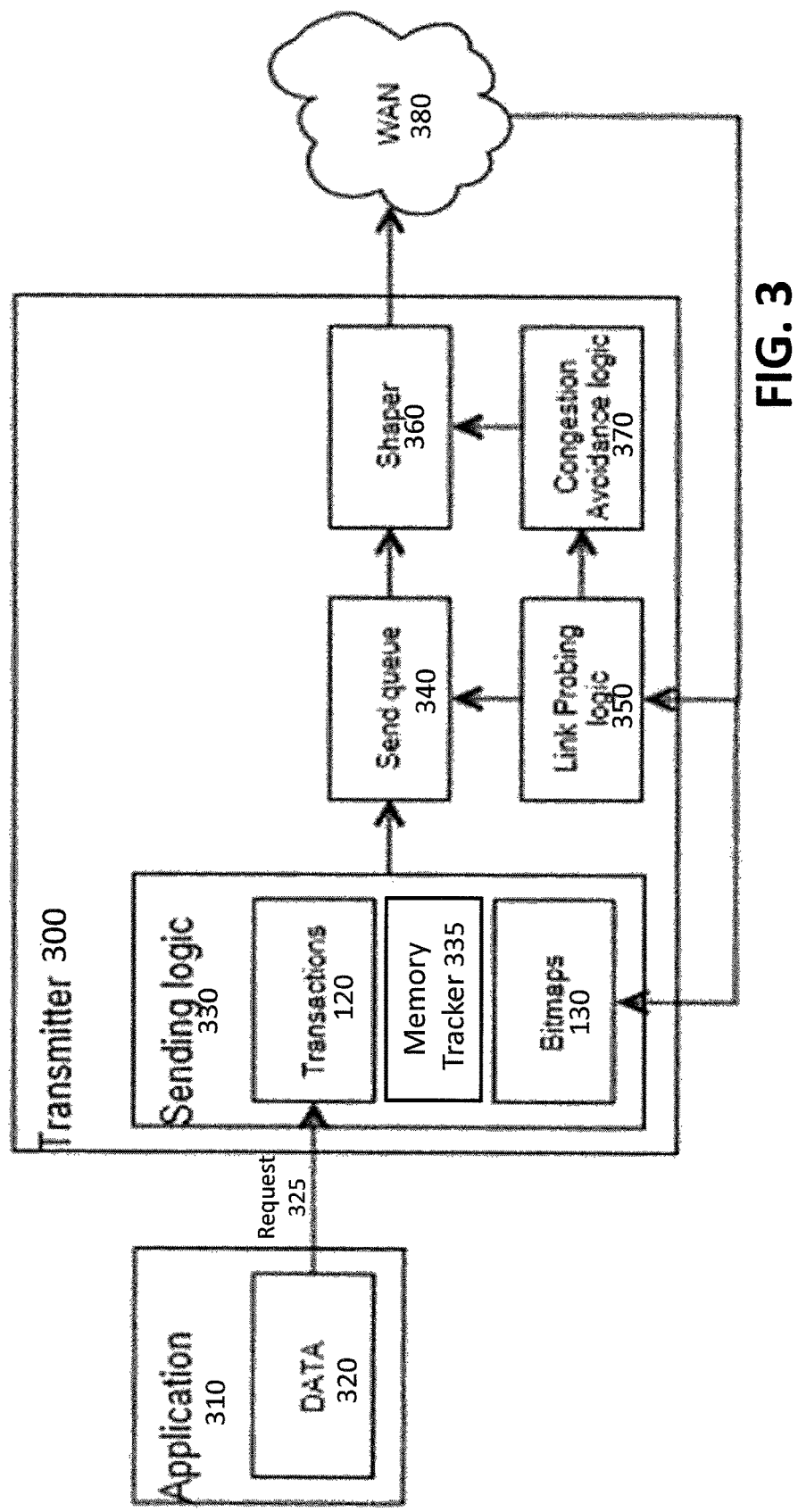

CONNECTION-ORIENTED COMMUNICATION DEVICES WITH ROUND TRIP TIME ESTIMATION

FIELD

The field relates generally to communications over a wide area network and, more particularly, to a connection-oriented protocol for wide area network communication devices.

BACKGROUND

The Transmission Control Protocol (TCP) has been very successful and significantly contributes to the popularity of the Internet. See, for example, M. Allman et al., "TCP Congestion Control," Request for Comments 5681 (RFC5681) (September 2009). A majority of Internet communications are transmitted using TCP. Recently, however, with the rapid advance of optical networks and rich Internet applications, TCP has been found to be less efficient as the network bandwidth-delay product (BDP) increases. Bandwidth-delay product refers to the product of the capacity of a data link (typically, in bits per second) and its round-trip delay time (typically, in seconds). BDP represents an amount of data measured in bits (or bytes) that is equivalent to the maximum amount of data on the network circuit at any given time (e.g., data that has been transmitted but not yet acknowledged).

The Additive Increase Multiplicative Decrease (AIMD) algorithm of TCP reduces the TCP congestion window significantly but fails to recover to the available bandwidth quickly. See, for example, D. Chiu, and R. Jain, "Analysis of the Increase/Decrease Algorithms for Congestion Avoidance in Computer Networks", ISDN Systems, Vol. 17, No. 1, 1-14 (June 1989). Theoretical flow level analysis has shown that TCP becomes more vulnerable to packet loss as the BDP increases. See, for example, T. V. Lakshman and U. Madhow, "The Performance of TCP/IP for Networks with High Bandwidth-Delay Products and Random Loss," IEEE ACM Trans. on Networking, Vol. 5 No 3, 336-50 (July 1997).

A need therefore exists for improved techniques for overcoming the inefficiency problem of TCP over high-speed wide area networks.

SUMMARY

Illustrative embodiments of the present invention provide connection-oriented communication devices with round trip time estimation. In at least one embodiment, a method is provided for communicating between a first communication device and a second communication device over at least one wide area communication network. The exemplary method at the first communication device comprises the steps of: the first communication device sending a Round Trip Time (RTT) packet to the second communication device, wherein the RTT packet comprises a timestamp, wherein the second communication device receives the RTT packet, copies the timestamp into a reply RTT packet and sends the reply RTT packet to the first communication device; receiving the reply RTT packet from the second communication device; and determining a current Round Trip Time based on a difference between the timestamp and a current time. A current Round Trip Time is optionally processed by a congestion avoidance and control algorithm.

In at least one embodiment, a train comprises a plurality of packets and the second communication device determines an available network bandwidth by dividing a size of the train by an amount of time it took to receive train. A length of the train is optionally based on the available network bandwidth.

In one or more embodiments, data of a transaction is divided into a plurality of chunks, and a bitmap is maintained for the chunks of the transaction indicating whether a given chunk has been acknowledged. The bitmap is optionally divided into a plurality of ranges, wherein each range has a due time indicating when the corresponding range must be transmitted and wherein the first communication device sends unacknowledged data chunks of a given range based on the due time.

In one exemplary embodiment, at least one application executing on the first communication device or the second communication device controls a size of a queue at the corresponding communication device based on conditions of the wide area communication network.

In one or more embodiments, the second communication device processes a transaction identifier of each received packet and processes a given received packet if the transaction identifier is known to the second communication device. In addition, the second communication device optionally processes a transaction identifier of each received packet and allocates a new transaction if the transaction identifier is not known to the second communication device and satisfies a predefined transaction identifier criteria. The second communication device can process a chunk identifier of each received packet to determine if a given packet is a new packet. The second communication device optionally updates a bitmap indicating whether a given chunk has been acknowledged and provides the bitmap to the first communication device.

Illustrative embodiments described herein provide significant improvements relative to the existing TCP protocol. In some of these embodiments, connection-oriented communication devices can estimate round trip time and thereby provide improved flexibility and efficiency in congestion avoidance and control algorithms compared to, for example, the TCP protocol.

BRIEF DESCRIPTION OF THE DRAWINGS

FIG. 2 is a sample table illustrating exemplary packet type assignment values;

FIG. 3 is a block diagram illustrating an exemplary BURST transmitter in accordance with an embodiment of the invention;

DETAILED DESCRIPTION

Figure 1:
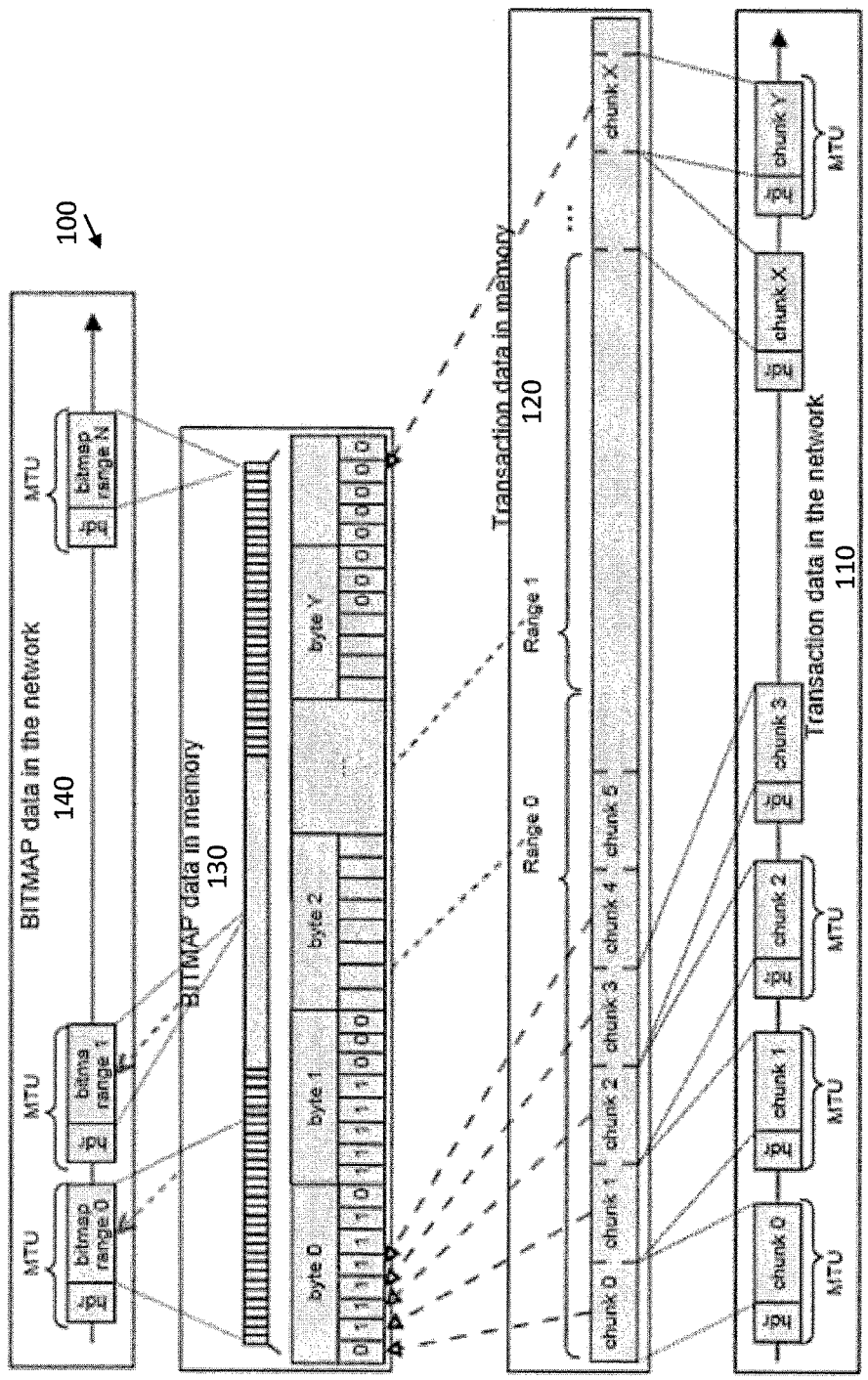
FIG. 1 illustrates an exemplary data model for an implementation of a BURST communication system.

Illustrative embodiments of the present invention will be described herein with reference to exemplary communication devices and associated clients, servers, and other processing and storage devices. It is to be appreciated, however, that the invention is not restricted to use with the particular illustrative device configurations shown.

In one exemplary embodiment, a data transfer protocol, comprising connection-oriented communication methods and apparatus, is provided, based on the User Datagram Protocol (UDP). See, for example, J. Postel, "User Datagram Protocol," Request for Comments 768 (RFC768) (August 1980), incorporated by reference herein in its entirety. Data and control packets are transferred using UDP. The connection-oriented aspect of the invention allows congestion control, reliability, and security to be maintained.

According to another aspect of the invention, a unicast duplex communication protocol is provided that supports reliable messaging. One or more exemplary embodiments provide for reliable simultaneous transactions over UDP. In the following discussion, the communication methods and systems described herein are referred to as "BURST," a recursive acronym for "BURST is UDP Reliable Simultaneous Transactions."

In one or more embodiments, a BURST communication system allows applications to control the size of memory windows, also referred to as memory constraints, in one or more of sending queues and receive queues. In this manner, a BURST communication system permits effective use of network bandwidth since more live data can be stored locally, as discussed further below, for example, in conjunction with FIGS. 3 and 4.

In at least one embodiment, the disclosed BURST data transfer protocol allows the available network bandwidth for a given connection to be automatically measured. In one exemplary embodiment, discussed further below in conjunction with FIG. 3, estimated Round Trip Time (RTT) of the network is measured by sending RTT packets carrying a current timestamp. The RTT packets are received, and the RTT can be measured as the difference between the send and receive timestamps for the RTT packets. The estimated RTT provides improved flexibility and efficiency in BURST congestion avoidance and control algorithms relative to, for instance, TCP. In addition, the disclosed BURST congestion avoidance and control algorithms are optionally pluggable and de-coupled from the protocol. In this manner, programs that rely on the features of BURST can be written independently of the underlying protocol.

In one or more embodiments, the protocol decision logic is optionally concentrated in the BURST transmitter, making the BURST receiver fully passive, allowing for robust BURST implementations with application programming interfaces (APIs) compatible with Berkeley sockets. Generally, Berkeley sockets are an application programming interface (API) for Internet sockets and Unix domain sockets, used for inter-process communication (IPC). Berkeley sockets are commonly implemented as a library of linkable modules.

Another aspect of the invention provides a protocol handshake procedure that allows clients to reconnect to a different server on the fly, for better load balancing and flexibility. One or more embodiments provide a connection-oriented, message-oriented, unicast, and duplex BURST data transfer protocol.

BURST Data Model

FIG. 1 illustrates an exemplary data model 100 for an implementation of a BURST communication system. BURST preserves application message boundaries during network transfers. An application message in BURST is referred to as a transaction. As shown in FIG. 1, in one or more embodiments, the transaction data 120 in the memory of the transmitter (discussed further below in conjunction with FIG. 2) for every transaction is broken down into chunks 0 through X. Chunks have a fixed size for any given transaction and do not exceed the underlying UDP transport Maximum Transfer Unit (MTU), including overhead. Thus, the transaction data 110 in the BURST network comprises a plurality of chunks 0 through X, each having an associated header (hdr). The last chunk in a transaction, referred to as a partial chunk, can have a size that is less than the size of other chunks in the transaction. Any given chunk is acknowledged by the receiver and this acknowledgement is tracked in a chunks bitmap 130 in the memory of the transmitter. Each chunk 0-X is associated with one bit in the bitmap 130 and the bitmap 130 holds all of the bits for a single transaction. The bitmap data 140 in the BURST network is divided into a plurality of ranges 0 through N. The length of a range is based on number of bits that can be packed into a byte stream that fits in the underlying transport MTU, including overhead.

FIG. 2 is a sample table 200 illustrating exemplary packet type assignment values. As shown in FIG. 2, for each defined packet type, the sample table 200 indicates the corresponding packet type value. In the embodiment shown in FIG. 2, the packet type values are four bit fields (bits 0-3) present in all BURST PDU headers and uniquely identify the packet type of the PDU. As noted above, in one or more embodiments, all BURST Protocol Data Units (PDUs) fit in the underlying transport layer MTU.

FIG. 3 is a block diagram illustrating an exemplary BURST transmitter 300. As shown in FIG. 3, the BURST transmitter 300 comprises sending logic 330 that receives application requests 325 to send application data 320 from an application 310. As noted above, the application data 320 is processed as transactions 120 comprising a plurality of chunks, each having an associated header (hdr). The transaction 120 is assigned an increasing 64-bit identifier. The size of the transaction can be recorded by a memory consumption tracker 335. If the memory consumption exceeds a predefined high watermark, the transmitter 300 stops accepting new data 320 from the application 310.

Figure 4:
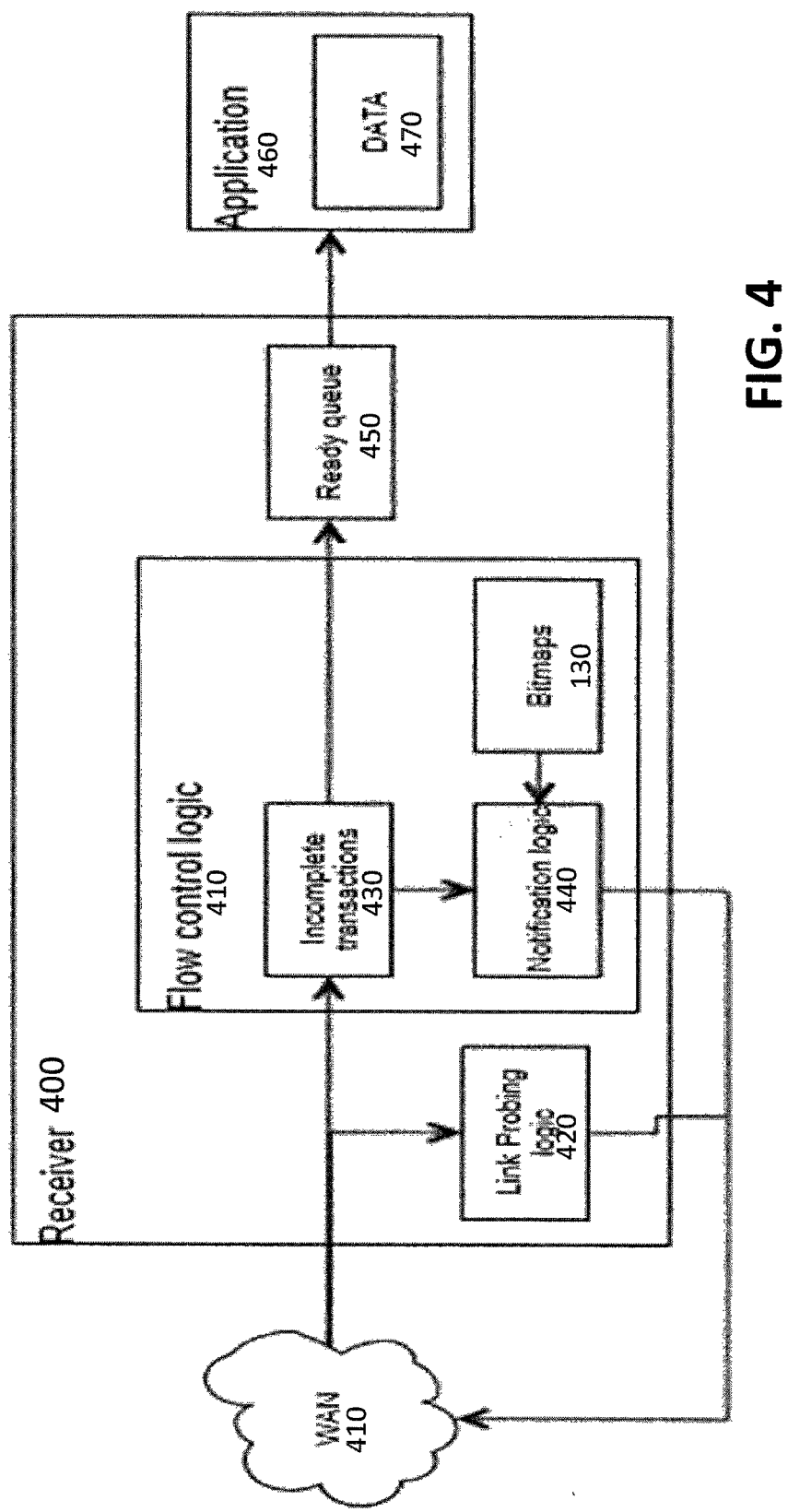
FIG. 4 is a block diagram illustrating an exemplary BURST receiver in accordance with an embodiment of the invention.

A given chunk is acknowledged by the receiver (400; FIG. 4) and this acknowledgement is tracked by the BURST transmitter 300 in the chunks bitmap 130 in the memory of the transmitter 300. In the chunks bitmap 130, each bit is initially set to 0 (i.e., not acknowledged). As noted above, the bitmap 130 is divided into the ranges. In one or more embodiments, each range has a range timestamp indicating when the range has to be sent (also referred to as due time). Initially, the range timestamp is set to zero (i.e., indicating that the due time has passed and send the range immediately). It is noted that individual chunks do not have due times, only the range has this attribute.

As noted above, in one or more embodiments, the application 310 can control the size of memory windows in the sending queue 340 to accommodate the storage of transactions 120. In this manner, the available network bandwidth can be used more effectively since more live data can be stored. The transactions 120 are stored into the sending queue 340, which is handled by a shaper 360, discussed below.

The size of each queue, such as the sending queue 340, is the memory constraint set by an application. The application may know the conditions of the WAN 380 (e.g., latency, maximum bandwidth and loss percent). Based on these values, the application can estimate how much memory is needed to effectively utilize this particular WAN 380.

It may happen that an application cannot provide all of the memory required, e.g., when the WAN 380 is 40 Gbps with a large delay, and the memory budget is tight. In this case, the disclosed BURST protocol operates on a best-effort basis and can exceed the performance of TCP.

It is noted that the BURST transmitter application 310 (and receiver application 460 of FIG. 4) may set different memory constraints for the respective BURST transmitter 300 and BURST receiver 400 (FIG. 4), but the transmitter 300 and receiver 400 will negotiate their memory constraints and the minimal of their constraints will be selected during a particular connection transfer.

The sending logic 330 maintains a sorted list of the range due times for transactions 120 in the sending queue 340. The unacknowledged data chunks of a range are sent when their range due time becomes current.

In addition, the sending logic 330 probes the available network bandwidth and periodically measures network Round Trip Time (RTT). In one or more embodiments, RTT is measured by sending probing RTT packets that carry a current timestamp. When a BACKRTT reply packet is received, the difference between the current time and the carried time allows for RTT evaluation. Available network bandwidth is calculated from the network queuing delay, discussed further below.

The sending logic 330 also processes control messages received from the local receiver 400. The local receiver 400 may request the BURST transmitter 300 to send BACKRTT and BITMAP packets, as discussed further below in conjunction with FIG. 4.

As noted above, the data chunks (DATA packet) of the transactions 120 are stored into the sending queue 340. In addition, a number of control messages (e.g., RTT, BACK-RTT and BITMAP packets) are also stored in the same sending queue 340, handled by the shaper 360.

Generally, the shaper 360 ensures (i) correct available network bandwidth consumption, (ii) congestion avoidance, and (iii) proper packet preparation and timing for available network bandwidth probing using link probing logic 350. In one or more embodiments, the shaper 360 sends the packets onto the wide area network (WAN) 380 in bursts, i.e., a number of packets are sent one after another without any delays between them. The burst of packets is referred to as a train.

Congestion avoidance logic 370 and the probed available bandwidth are the inputs for the shaper 360. Based on this input, the shaper 360 calculates the length of the train. Each packet that gets into a train is assigned a train sequence number, e.g., starting from 0. The train sequence numbers are used by the receiver 400 to calculate the network queuing delay, as discussed further below in conjunction with FIG. 5. Once the train is sent, the due times are updated for the ranges that were sent. The next range due time is calculated based on the current RTT measurement.

The sending logic 330 sleeps until the range sending time of another transaction is due, or a periodic RTT measurement is required, for example, based on a timer. While sending logic 330 sleeps, the transmitter 300 can receive chunk acknowledgements, and the chunks bitmap 130 is updated accordingly. A given transaction 120 becomes complete when all of the chunks in the given transaction 120 are acknowledged. Thereafter, the size of the completed transaction 120 is subtracted from the memory consumption tracking 335 and its memory can be freed.

FIG. 4 is a block diagram illustrating an exemplary BURST receiver 400. In one or more embodiments, the exemplary BURST receiver 400 receives packet trains from the wide area network (WAN) 410. As shown in FIG. 4, the exemplary BURST receiver 400 comprises flow control logic 410, link probing logic 420 and a ready queue 450. The exemplary flow control logic 410 further comprises a set of incomplete transactions 430, notification logic 440 and the bitmaps 130.

As noted above, in one or more embodiments, a BURST communication system allows applications to control the size of memory windows, also referred to as memory constraints, in one or more of sending queues 340 and receive (ready) queues 450. In this manner, a BURST communication system permits effective use of network bandwidth since more live data can be stored. An application 460 at the BURST receiver 400 may know the conditions of the WAN 410 (e.g., latency, maximum bandwidth and loss percent). Based on these values, the application can estimate how much memory is needed to effectively utilize this particular WAN 410.

The exemplary BURST receiver 400 maintains the list of incomplete transactions 430, as well as a list of complete transactions (not shown in FIG. 4). In addition, the exemplary BURST receiver 400 maintains variables that hold the lowest and highest transaction identifiers, known to the receiver: $tid_{low}$ and $tid_{high}$, respectively; and variables that hold the transaction identifier and chunk range of the last DATA packet: $tid_{last}$ and $range_{last}$, respectively.

Figure 5:
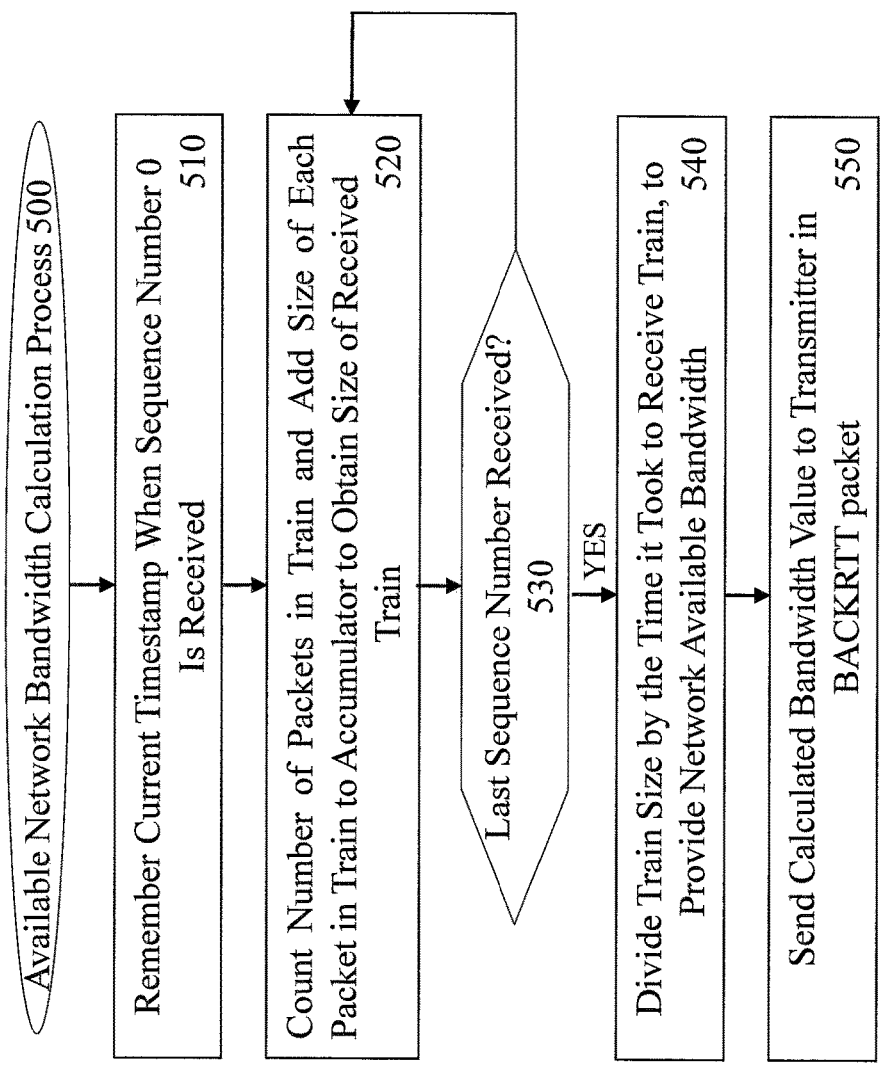
FIG. 5 is a flow chart illustrating an exemplary implementation of an available network bandwidth calculation process according to one embodiment of the invention.

The receiver 400 receives incoming flow of different packets: DATA, RTT, BITMAP and BACKRTT. All packets have a train sequence number that is used to calculate the available network bandwidth. FIG. 5 is a flow chart illustrating an exemplary implementation of an available network bandwidth calculation process 500 according to one embodiment of the invention. As shown in FIG. 5, the available network bandwidth calculation process 500 remembers the current timestamp during step 510, when sequence number 0 is received. In addition, the number of packets in the train is counted during step 520 and the size of each packet in the train is added to an accumulator to obtain the size of the entire received train. When last sequence number is received, as detected during step 530, the train size is divided by the time it took to receive the train during step 540, to provide the network available bandwidth. The calculated bandwidth value is sent back to the transmitter during step 550 in the BACKRTT packet.

FIGS. 6A through 6D comprise a flow chart illustrating an exemplary implementation of a packet handling process according to one embodiment of the invention. The exemplary packet handling process processes data packets, RTT packets and BACKRTT packets.

Figure 6A:
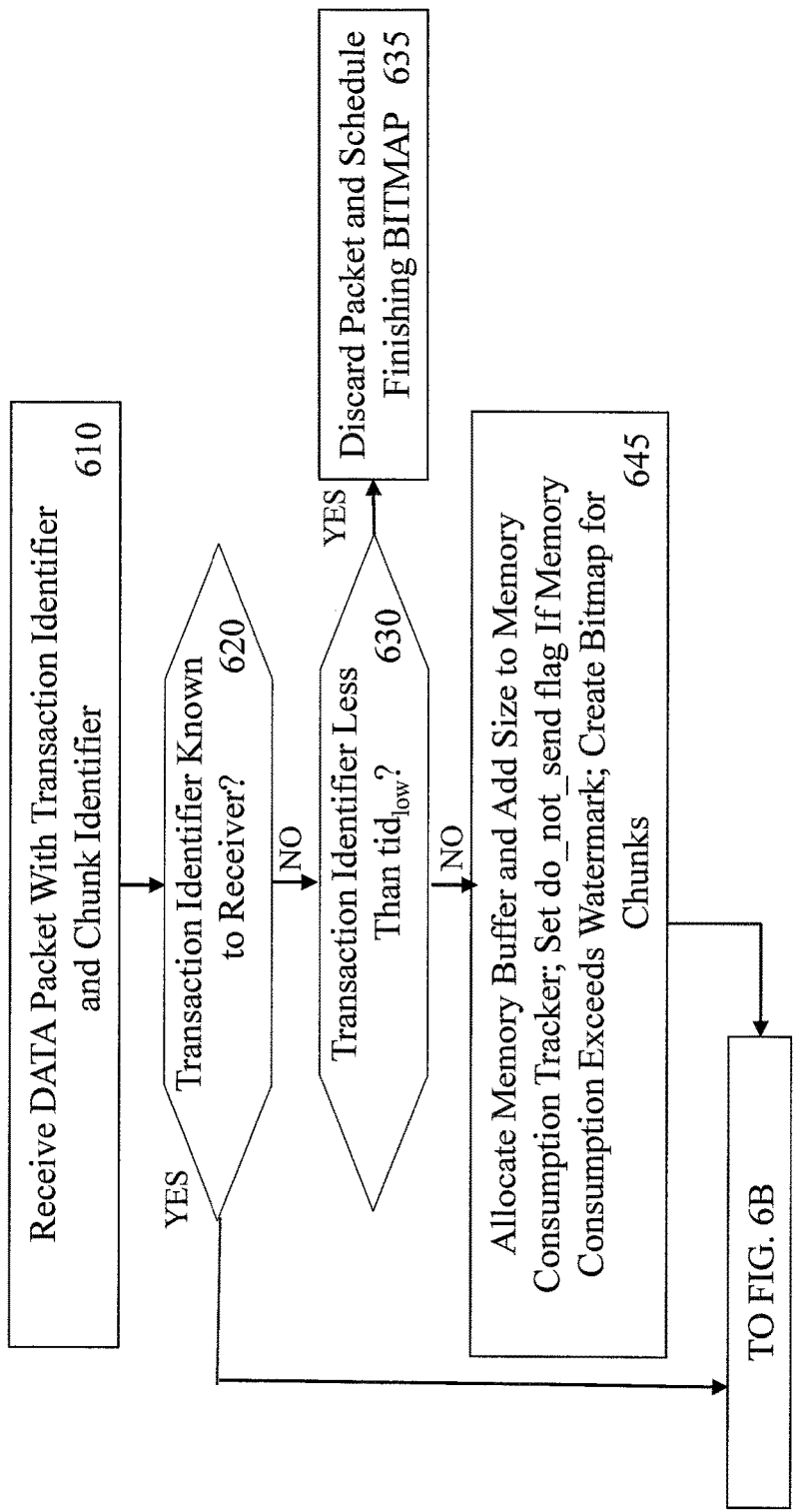
FIGS. 6A through 6D comprise a flow chart illustrating an exemplary implementation of a packet handling process according to one embodiment of the invention.

Each DATA packet received during step 610 has a transaction identifier and a chunk identifier in its header. As shown in FIG. 6A, the exemplary packet handling process processes the transaction identifier during step 620 to determine whether the transaction identifier is known to the receiver by comparing the transaction identifier with $tid_{low}$ and $tid_{high}$. The transaction identifier is known to the receiver if the transaction identifier is greater than $tid_{low}$ and less than or equal to $tid_{high}$.

If it is determined during step 620 that the transaction identifier is known, then the packet is processed further. If, however, it is determined during step 620 that the transaction identifier is not known, then its value is compared to $tid_{low}$ during step 630. If the transaction identifier is less than $tid_{low}$, then the transaction was completely received, but the sender did not receive a finishing BITMAP for the transaction; the packet is discarded and the finishing BITMAP is scheduled to send again during step 635.

If the transaction identifier is not known to the receiver and the transaction identifier is not less than $tid_{low}$, then the new transaction appears. The receiver allocates for this new transaction, and the packet is processed further. A memory buffer for transaction is allocated during step 645 and its size is added to the memory consumption tracker. If the memory consumption is above a predefined high watermark, then the receiver sets do_not_send flag to the transmitter with the BACKRTT packet. In addition, the bitmap is created for the chunks of the transaction, where each bit is set to 0 (i.e., not present/not acknowledged).

Figure 6B:
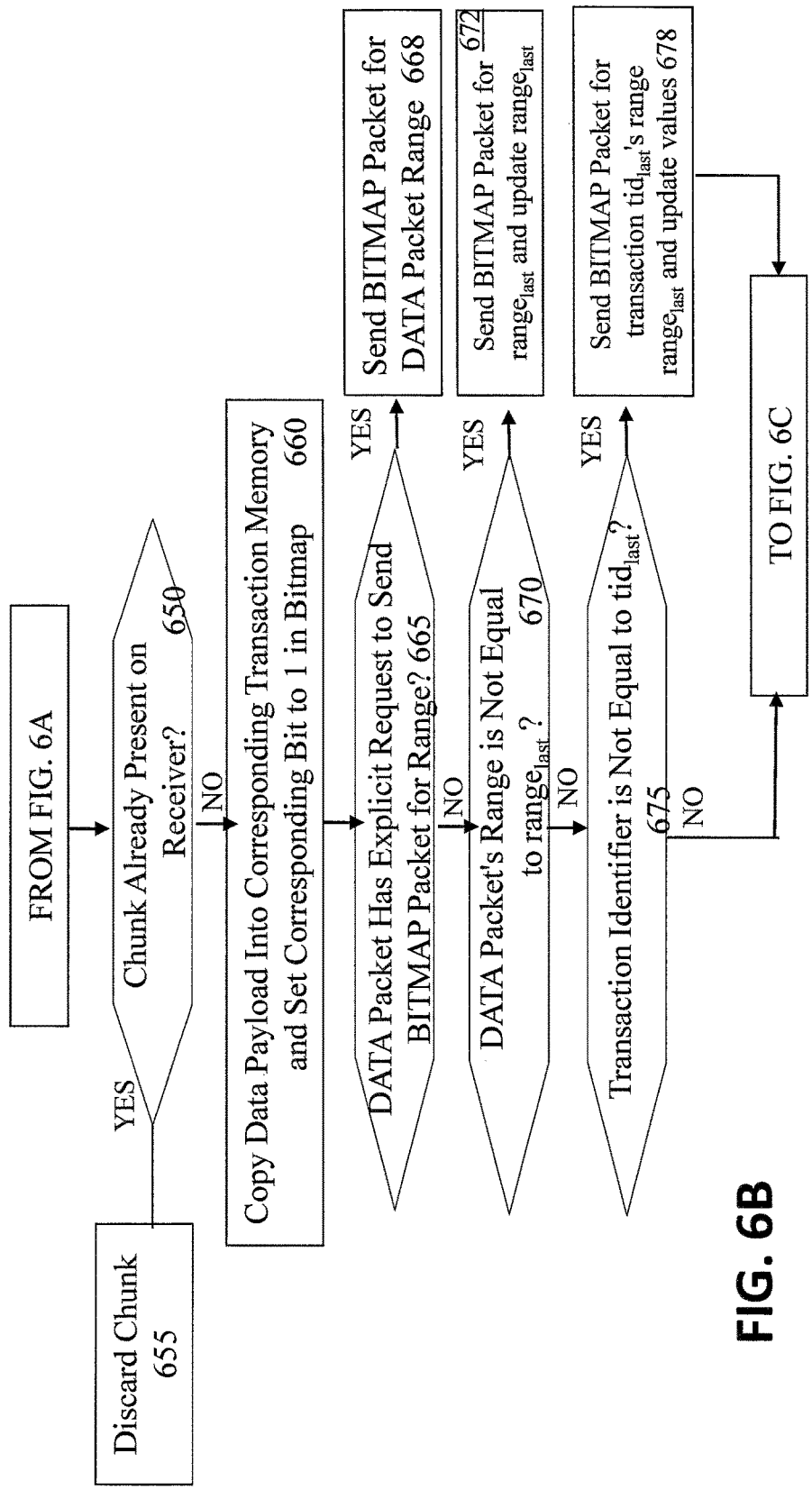
Figure 6C:
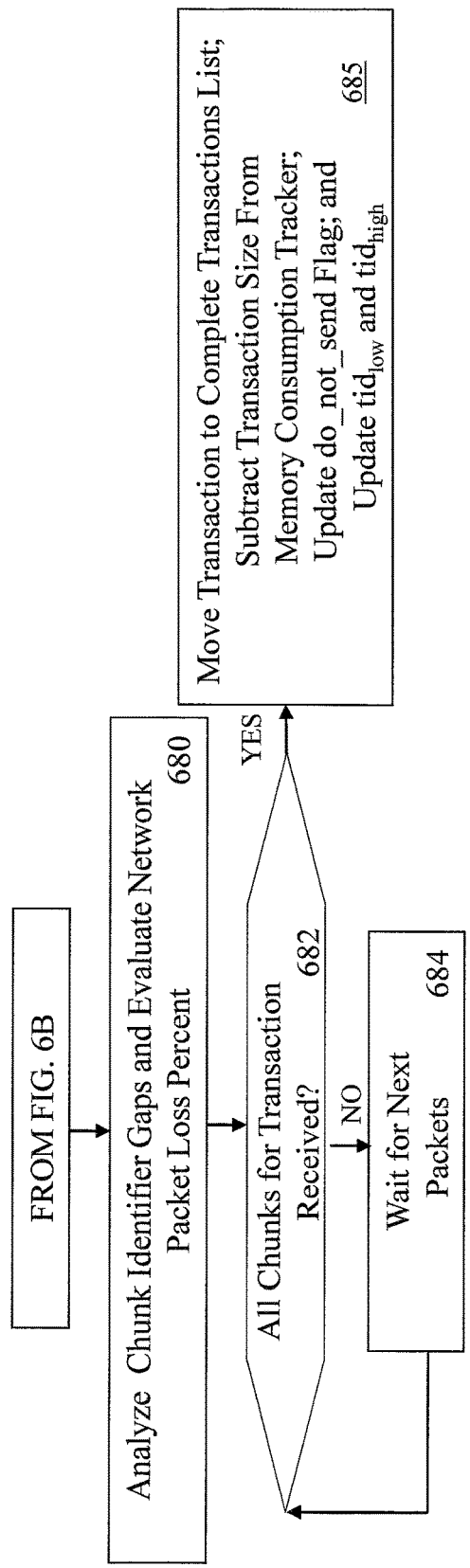

As shown in FIG. 6B, the exemplary packet handling process evaluates the chunk identifier during step 650 to determine if the corresponding chunk of data is already present on the receiver 400. If the corresponding chunk of data is not already present on the receiver 400, the data payload is copied into the corresponding transaction memory during step 660 and the corresponding bit for the chunk is set to 1 in the bitmap. If the corresponding chunk of data is already present on the receiver 400, the data chunk is considered duplicate and is discarded during step 655.

The exemplary packet handling process processes information in the DATA packet header and state variables during step 665, and determines whether to send the BITMAP packet that contains a collective acknowledgement for all chunks in a range. If it is determined during step 665 that the DATA packet has explicit request to send the BITMAP packet for the range, the BITMAP packet for the DATA packet's range is scheduled to send during step 668.

If it is determined during step 670 that the DATA packet's range is not equal to $range_{last}$, then the BITMAP packet for the $range_{last}$ is scheduled to send during step 672 and the $range_{last}$ is updated with current range. If it is determined during step 675 that the DATA packet's transaction identifier is not equal to $tid_{last}$, the BITMAP packet for transaction $tid_{last}$'s range $range_{last}$ is scheduled to send during step 678, the $tid_{last}$ and $range_{last}$ are updated with current values.

The exemplary packet handling process analyzes the chunk identifier gaps and evaluates network packet loss percent during step 680. The loss percent value can be sent to the remote transmitter 300 with a BACKRTT packet. If all chunks for a transaction are not yet received during step 682, then the process waits for the next packets until all chunks of the transaction are received during step 684.

Once all chunks for a transaction are received during step 682, then the transaction is complete. During step 685, the transaction is moved to the complete transactions list, and made available for an application; the transaction's size is subtracted from the memory consumption tracker; the do_not_send flag is updated accordingly and $tid_{low}$ and $tid_{high}$ are updated accordingly to complete the data packet processing.

Figure 6D:
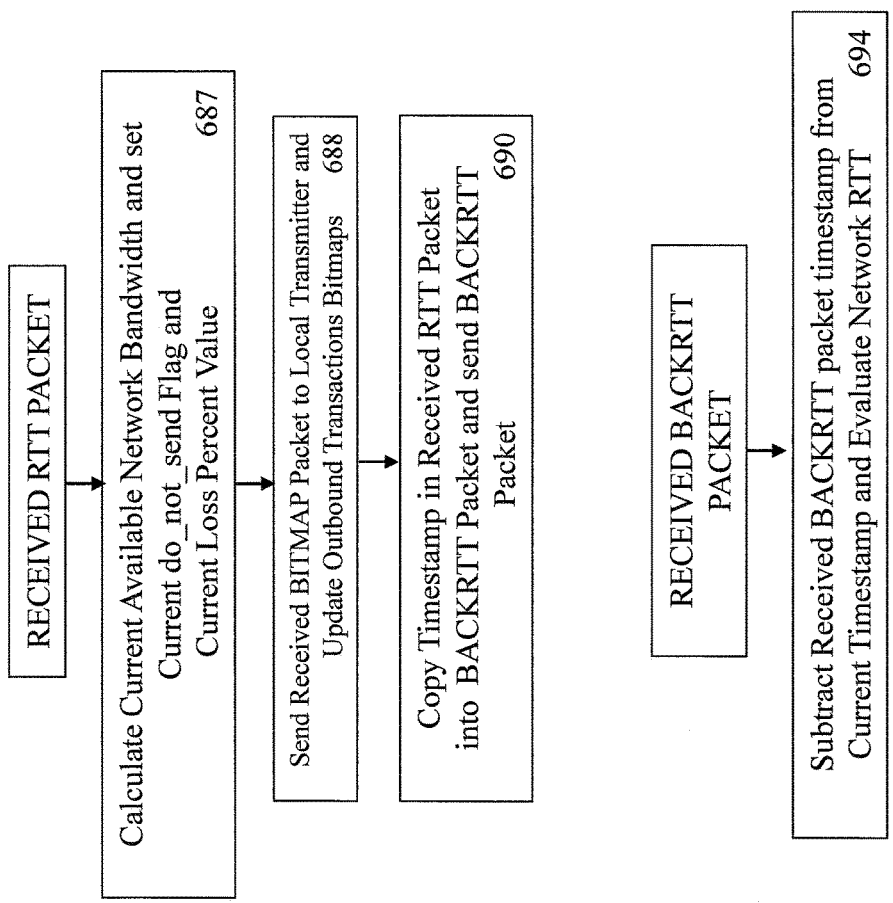

FIG. 6D illustrates the processing of RTT packets and BACKRTT packets. As shown in FIG. 6D, for a received RTT packet, the current available network bandwidth is calculated during step 687 on the receiver 400, and the current do_not_send flag and current loss percent value are sent in a BACKRTT packet to the remote transmitter 300. The current available network bandwidth is calculated using the available network bandwidth calculation process 500 (FIG. 5).

The received BITMAP packet is passed to the local transmitter during step 688 and the transmitter updates outbound transactions bitmaps accordingly. The timestamp contained in the received RTT packet is copied into BACKRTT packet and the BACKRTT packet is scheduled to send during step 690. The local transmitter optionally makes a time correction on the BACKRTT timestamp to exclude processing time to make RTT evaluation more precise.

As shown in FIG. 6D, for a received BACKRTT packet, the received BACKRTT packet timestamp is subtracted from the current timestamp during step 694 and the network RTT is evaluated. The RTT value, available bandwidth and loss percent are the inputs for the congestion control algorithm(s). In one or more embodiments, the congestion control algorithm(s) can be implemented based on those disclosed in U.S. patent application Ser. No. 14/236,273, filed Aug. 25, 2014, entitled "Congestion Avoidance and Control for UDP-Based Protocols," incorporated by reference herein in its entirety.

Figure 7:
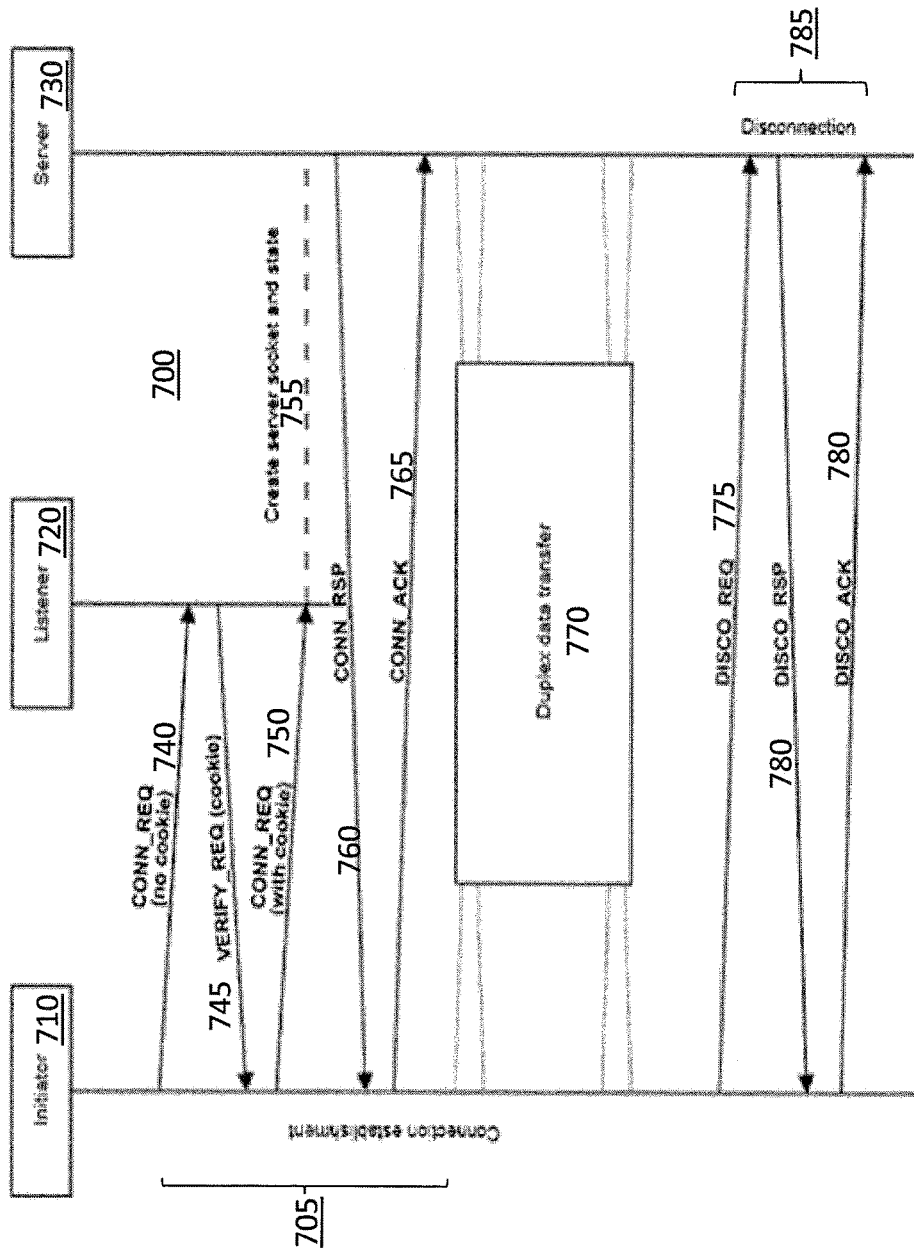
FIG. 7 is a communication diagram illustrating a BURST connection initiation, data transfer and connection shutdown in accordance with one or more embodiments of the invention.

FIG. 7 is a communication diagram 700 illustrating a BURST connection initiation 705, data transfer 770 and connection shutdown (disconnection) 785 in accordance with one or more embodiments of the invention. As shown in FIG. 7, an exemplary connection initiation 705 comprises a connection request 740 from an initiator 710 to a listener 720. The listener 720 responds with a verify request 745 having a cookie. The initiator 710 responds with another connection request 750 with the received cookie. The listener 720 creates a server socket and state 755 with a server 730. The server then provides a connection response 760 to the initiator 710 and the initiator 710 responds to the server 730 with a connection acknowledgement 765, to set up the connection. Thereafter, duplex data transfer 770 occurs between the initiator 710 and server 730.

When the initiator 710 has completed the data transfer 770, the initiator 710 sends a disconnection request 775 to the server 730. The server 730 responds with a disconnection response 780 to the initiator 710. The initiator 710 then acknowledges the disconnection with a reply 780.

In one or more exemplary embodiments, BURST is a three-way handshake protocol that is immune to "SYN flooding"-type attacks. In addition, a CONN_RSP packet can carry an IP address and port that is different from those of the Listener 720, allowing for on-the-fly client reconnection to a different server.

Figure 8:
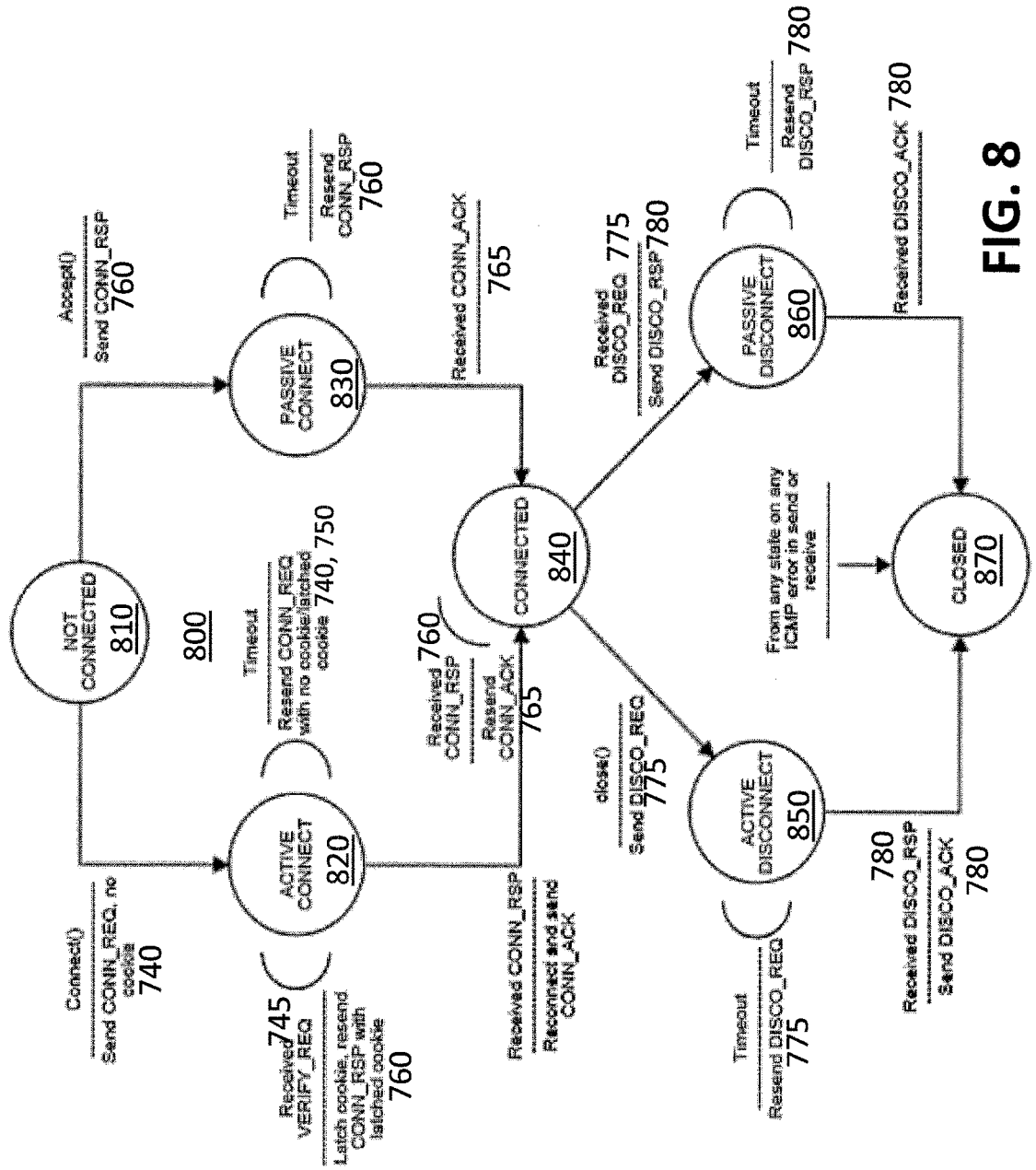
FIGS. 8 and 9 illustrate exemplary socket state flow diagrams to show various state transitions for the communications shown in FIG. 7.

FIG. 8 illustrates an exemplary socket state flow diagram 800 to show the various state transitions 810, 820, 830, 840, 850, 860, 870 for the various communications shown in FIG. 7.

Figure 9:
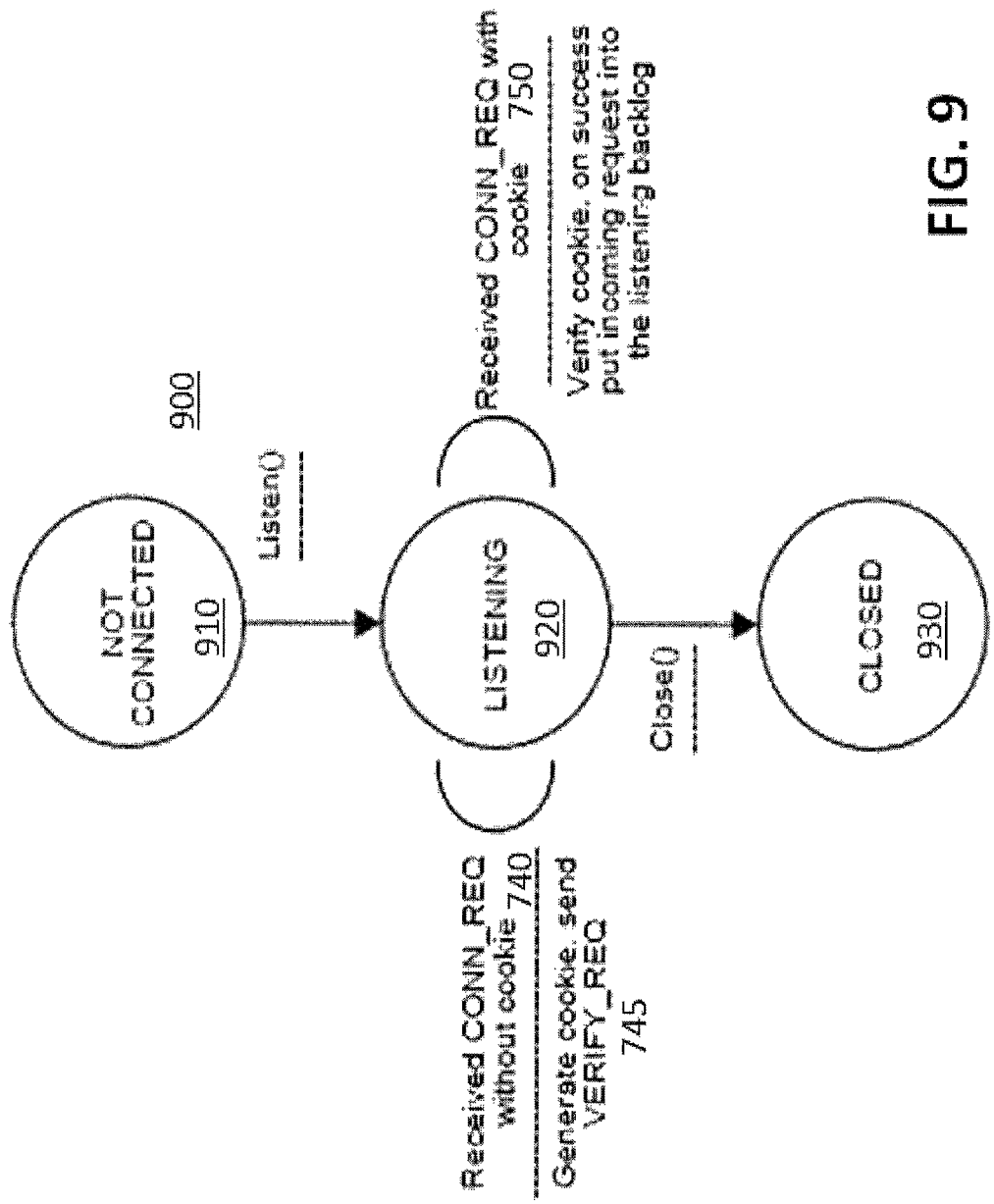

FIG. 9 illustrates an exemplary socket state flow diagram 900 to show the various state transitions 910, 920, 930 of the listener 720 for the various communications shown in FIG. 7.

In one or more exemplary embodiments, security can be implemented externally using BURST as a reliable transport. For example, OpenSSL or RSA BSAFE Transport Layer Security implementations can be used on top of BURST.

Among other benefits, the disclosed BURST protocol can be employed for bulk data transfers, such as replication and cloud data uploads.

CONCLUSION

The foregoing applications and associated embodiments should be considered as illustrative only, and numerous other embodiments can be configured using the techniques disclosed herein, in a wide variety of different applications.

It should also be understood that the connection-oriented communication techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The communication devices may be implemented using one or more processing platforms. One or more of the processing modules or other components may therefore each run on a computer, storage device or other processing platform element. A given such element may be viewed as an example of what is more generally referred to herein as a "processing device."

Figure 10:
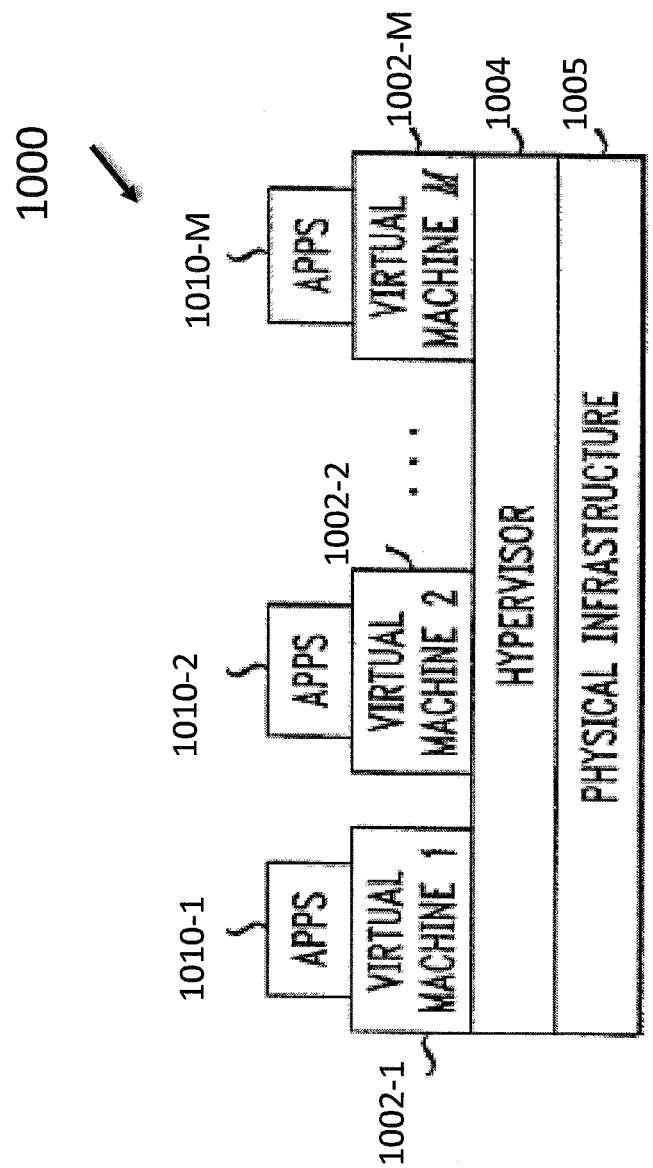
FIG. 10 illustrates an exemplary processing platform that may be used to implement at least a portion of one or more embodiments of the invention comprising a cloud infrastructure.

Referring now to FIG. 10, one possible processing platform that may be used to implement at least a portion of one or more embodiments of the invention comprises cloud infrastructure 1000. The cloud infrastructure 1000 in this exemplary processing platform comprises virtual machines (VMs) 1002-1, 1002-2, . . . 1002-M implemented using a hypervisor 1004. The hypervisor 1004 runs on physical infrastructure 1005. The cloud infrastructure 1000 further comprises sets of applications 1010-1, 1010-2, . . . 1010-M running on respective ones of the virtual machines 1002-1, 1002-2, . . . 1002-M under the control of the hypervisor 1004.

The cloud infrastructure 1000 may encompass the entire given system or only portions of that given system, such as one or more of client, servers, controller, authentication server or relying server in the system.

Although only a single hypervisor 1004 is shown in the embodiment of FIG. 10, the system may of course include multiple hypervisors each providing a set of virtual machines using at least one underlying physical machine.

An example of a commercially available hypervisor platform that may be used to implement hypervisor 1004 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from EMC Corporation of Hopkinton, Mass. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or servers may be associated with respective cloud tenants of a multi-tenant environment. Containers may be used in combination with other virtualization infrastructure such as virtual machines implemented using a hypervisor.

Figure 11:
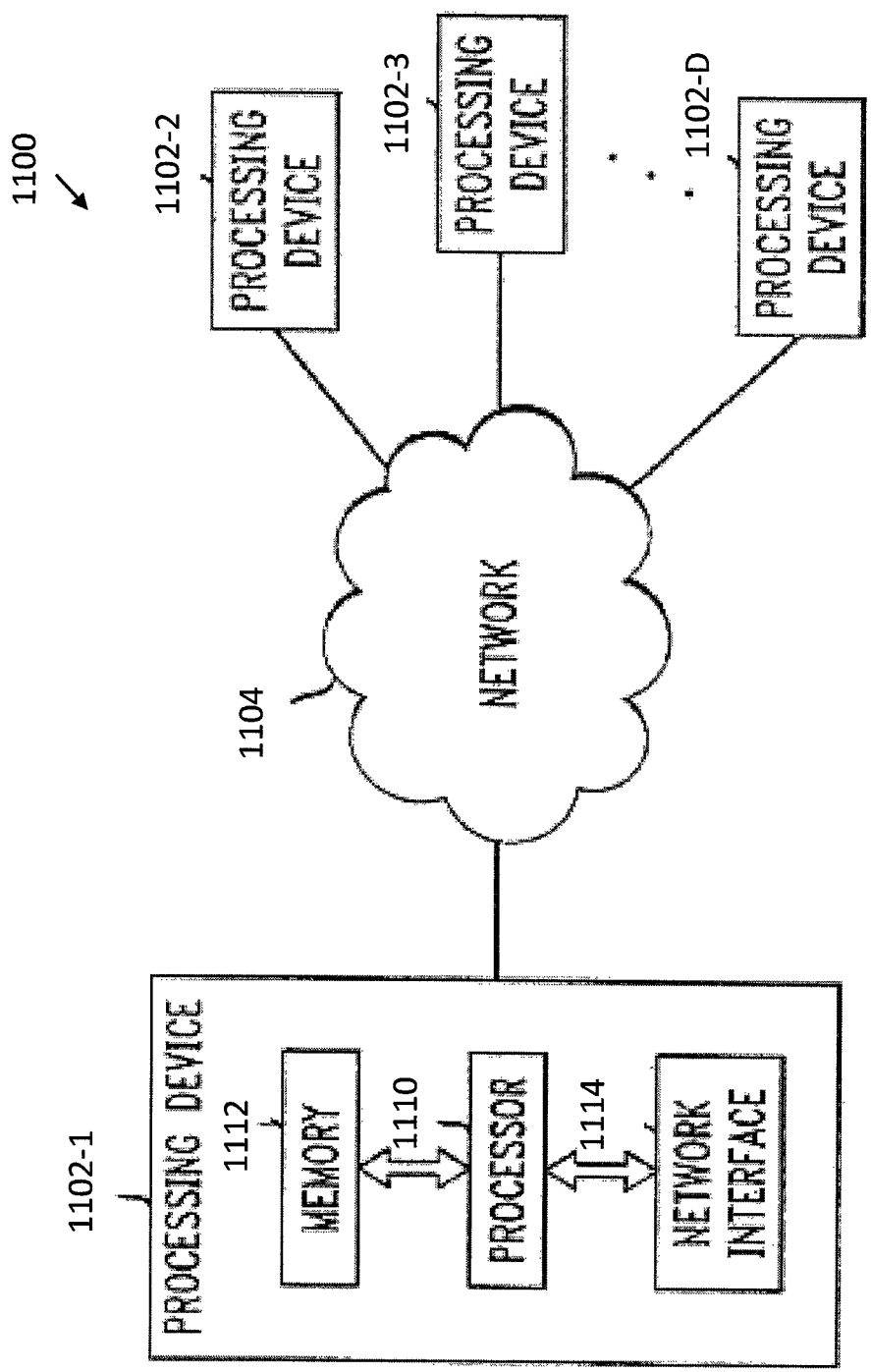
FIG. 11 illustrates another exemplary processing platform that may be used to implement at least a portion of one or more embodiments of the invention.

Another example of a processing platform is processing platform 1100 shown in FIG. 11. The processing platform 1100 in this embodiment comprises at least a portion of the given system and includes a plurality of processing devices, denoted 1102-1, 1102-2, 1102-3, . . . 1102-D, which communicate with one another over a network 1104. The network 1104 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an application specific integrated circuit (ASIC), a field programmable gate array (FPGA) or other type of processing circuitry, as well as portions or combinations of such circuitry elements, and the memory 1112, which may be viewed as an example of a "computer program product" having executable computer program code embodied therein, may comprise random access memory (RAM), read only memory (ROM) or other types of memory, in any combination.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Multiple elements of the system may be collectively implemented on a common processing platform of the type shown in FIG. 10 or 11, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It should again be emphasized that the above-described embodiments of the invention are presented for purposes of illustration only. Many variations and other alternative embodiments may be used. For example, the techniques are applicable to a wide variety of other types of storage systems that can benefit from the connection-oriented communication techniques disclosed herein. Also, the particular configuration of communication device elements shown herein, and the associated connection-oriented communication techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for communicating between a first communication device and a second communication device over at least one wide area communication network, the method at the first communication device comprising steps of:
    the first communication device sending a first Round Trip Time (RTT) packet to the second communication device over said at least one wide area communication network, wherein said first RTT packet comprises a timestamp, wherein the second communication device receives said first RTT packet, copies the timestamp into a second reply RTT packet and sends the second reply RTT packet to the first communication device over said at least one wide area communication network;
    receiving, by the first communication device, the second reply RTT packet from the second communication device;
    determining, by the first communication device, a current Round Trip Time based on a difference between said timestamp and a current time; and
    wherein data of a transaction is divided into a plurality of chunks, wherein a bitmap is maintained for the chunks of the transaction indicating whether a given chunk has been acknowledged, wherein the bitmap is divided into a plurality of ranges, wherein each range has a due time indicating when the corresponding range is due to be transmitted and wherein the method further comprises the first communication device sending unacknowledged data chunks of a given range based on said due time.

2. The method of claim 1, wherein a train comprises a plurality of packets and wherein the second communication device determines an available network bandwidth by dividing a size of said train by an amount of time it took to receive the train.

3. The method of claim 2, wherein a length of said train is based on said available network bandwidth.

4. The method of claim 1, wherein a current Round Trip Time is processed by a congestion avoidance and control algorithm.

5. The method of claim 1, wherein at least one application executing on one or more of said first communication device and said second communication device controls a size of a queue at said one or more of said first communication device and said second communication device based on conditions of said at least one wide area communication network.

6. The method of claim 1, wherein the second communication device processes a transaction identifier of each received packet and processes a given received packet if the transaction identifier is known to the second communication device.

7. The method of claim 1, wherein the second communication device processes a transaction identifier of each received packet and allocates a new transaction if the transaction identifier is not known to the second communication device and satisfies a predefined transaction identifier criteria.

8. The method of claim 1, wherein the second communication device processes a chunk identifier of each received packet to determine if a given packet is a new packet.

9. The method of claim 1, wherein the second communication device updates a bitmap indicating whether a given chunk has been acknowledged and provides said bitmap to the first communication device.

10. The method of claim 1, wherein the second communication device completes a transaction when all chunks of the transaction are received.

11. A non-transitory machine-readable recordable storage medium, wherein one or more software programs when executed by one or more processing devices implement the steps of the method of claim 1.

12. A first communication device for communicating with a second communication device over at least one wide area communication network, the first communication device comprising:
    a memory; and
    at least one processing device, coupled to the memory, operative to:
    send a first Round Trip Time (RTT) packet to the second communication device over said at least one wide area communication network, wherein said first RTT packet comprises a timestamp, wherein the second communication device receives said first RTT packet, copies the timestamp into a second reply RTT packet and sends the second reply RTT packet to the first communication device over said at least one wide area communication network;
    receive, by the first communication device, the second reply RTT packet from the second communication device;
    determine, by the first communication device, a current Round Trip Time based on a difference between said timestamp and a current time; and
    wherein data of a transaction is divided into a plurality of chunks, wherein a bitmap is maintained for the chunks of the transaction indicating whether a given chunk has been acknowledged, wherein the bitmap is divided into a plurality of ranges, wherein each range has a due time indicating when the corresponding range is due to be transmitted and wherein the first communication device sends unacknowledged data chunks of a given range based on said due time.

13. The first communication device of claim 12, wherein a current Round Trip Time is processed by a congestion avoidance and control algorithm.

14. The first communication device of claim 12, wherein at least one application executing on one or more of said first communication device and said second communication device controls a size of a queue at said one or more of said first communication device and said second communication device based on conditions of said at least one wide area communication network.

15. A second communication device for communicating with a first communication device over at least one wide area communication network, the second communication device comprising:
   a memory; and
   at least one processing device, coupled to the memory, operative to:
   receive a first Round Trip Time (RTT) packet from the first communication device over said at least one wide area communication network, wherein said first RTT packet comprises a timestamp,
   copy, by the second communication device, the timestamp into a second reply RTT packet;
   send, by the second communication device, the second reply RTT packet to the first communication device over said at least one wide area communication network,
   wherein the first communication device receives the second reply RTT packet from the second communication device over said at least one wide area communication network and determines a current Round Trip Time based on a difference between said timestamp and a current time; and
   wherein data of a transaction is divided into a plurality of chunks, wherein a bitmap is maintained for the chunks of the transaction indicating whether a given chunk has been acknowledged, wherein the bitmap is divided into a plurality of ranges, wherein each range has a due time indicating when the corresponding range is due to be transmitted and wherein the first communication device sends unacknowledged data chunks of a given range to the second communication device based on said due time.

16. The second communication device of claim 15, wherein a train comprises a plurality of packets and wherein said at least one processing device is further configured to determine an available network bandwidth by dividing a size of said train by an amount of time it took to receive the train and wherein a length of said train is based on said available network bandwidth.

17. The second communication device of claim 15, wherein the second communication device processes a transaction identifier of each received packet and processes a given received packet if the transaction identifier is known to the second communication device.

18. The second communication device of claim 15, wherein the second communication device processes a transaction identifier of each received packet and allocates a new transaction if the transaction identifier is not known to the second communication device and satisfies a predefined transaction identifier criteria.

19. The second communication device of claim 15, wherein the second communication device processes a chunk identifier of each received packet to determine if a given packet is a new packet.

20. The second communication device of claim 15, wherein the second communication device updates a bitmap indicating whether a given chunk has been acknowledged and provides said bitmap to the first communication device.

21. The second communication device of claim 15, wherein the second communication device completes a transaction when all chunks of the transaction are received.

* * * * *